United States Patent
Howell et al.

[15] 3,653,927
[45] Apr. 4, 1972

[54] A METHOD OF PACKAGING MEAT

[72] Inventors: Lawrence E. Howell; Howard Vance Bailiff, both of Sacramento, Calif.

[73] Assignees: Western Meats; Lawrence E. Howell; Howard Vance Bailiff, Sacramento, Calif., part interest to each

[22] Filed: Dec. 31, 1969

[21] Appl. No.: 889,614

[52] U.S. Cl. ............................. 99/174, 117/168, 161/57, 161/129, 161/235
[51] Int. Cl. ............................................. B65b 25/06
[58] Field of Search .................. 99/174; 161/150, 234, 235, 161/79; 117/11, 158, 168, 138.8 E; 162/108

[56] References Cited

UNITED STATES PATENTS

| | | |
|---|---|---|
| 2,891,870 | 6/1959 | Selby et al. ............................. 99/174 |
| 3,477,084 | 11/1969 | Thomas ............................. 161/129 X |
| 2,405,521 | 8/1946 | Rowe ............................. 161/129 X |
| 2,182,190 | 12/1939 | Williams et al. ............................. 99/174 |
| 2,140,162 | 12/1938 | McKee ............................. 99/174 X |
| 3,124,468 | 3/1964 | Williams ............................. 99/174 |
| 3,340,089 | 9/1967 | Bougie ............................. 99/174 UX |

Primary Examiner—Tim R. Miles
Assistant Examiner—Steven L. Weinstein
Attorney—Lothrop & West

[57] ABSTRACT

Rough-textured, reinforced paper towel stock is impregnated with a food-grade wax and cut into sheets large enough to cover and project substantially outwardly from the periphery of the concave side of a bone-in and tied cut of meat, such as roast-ready rib, or the like. The overhanging projecting margin of the wax paper material is thereupon folded downwardly substantially at right angles, to cover any exposed bone on the edges or ends of the cut and to afford a peripheral skirt, or apron around the upper portion of the cut. The wrapped meat is then placed in a heat-shrinkable bag, and following air removal and sealing, the bag is subjected to heat so as to effect shrinkage of the bag into skin-tight relation with the enclosed meat. The bag and contents are thereupon removed and transferred elsewhere, such as to storage or shipment.

2 Claims, 6 Drawing Figures

Patented April 4, 1972

3,653,927

INVENTORS
HOWARD VANCE BAILIFF
LAWRENCE E. HOWELL
BY
Lothrop & West
ATTORNEYS

A METHOD OF PACKAGING MEAT

The invention relates to improvements in materials for wrapping meat and methods of packaging meat.

Heat shrinkable plastic material has long been used for making bags which are employed in the packaging of various cuts of meats. After the meat is inserted in the bag air is withdrawn from the bag and the bag sealed. After sealing, the bag is subjected to heat, as by being immersed in very hot water, or placed in a hot air tunnel, the heat causing the plastic to shrink and become skin-tight.

In the event the packaged meat is of the bone-in primal cut variety where exposed bone tends to puncture a high percentage of the bags, use had been made of a piece of low melting non-toxic wax impregnated cloth, the cloth being applied over the exposed bone for protection.

See, for example, M. S. Selby et al. U.S. Pat. No. 2,891,870 granted June 23, 1959, for Method of Packaging.

The foregoing patent utilizes, as a protective sheet, a wax impregnated cloth, such as cheesecloth, "e.g. unbleached muslin with a 32 × 28 count" (Column 2, line 10) and specifically points out the dissimilarities, for the purpose intended, between cloth and "plastic sheeting or similar material" (Column 2, line 15) and the distinctions existing between cloth and paper (Column 3, line 20 et seq.). The reference patent in other words, not only does not teach the use of paper as a base material, but in fact tends to discourage the public from using paper protectors in connection with heat shrinkable meat bags.

It is also to be noted that the package and method disclosed in the reference patent may be effective, as it states, in preventing bag punctures and leakers caused by exposed bone. The reference patent, however, does not teach any cure for bag ruptures and leakers which occur as a result of the restraightening, or rebridging, which often takes place as the taut twine loops used in tying certain cuts of meat tend to return to their initial linear condition despite the strong, holding down force exerted by the skin-tight bag.

In the case of certain primal cuts of beef, for example, such as a roast-ready rib (sometimes known as prime rib or standing rib) the curvature of the ribs is such that when the bone-in cut is tied, girthwise and lengthwise, by strong twine, there exists a substantial unsupported span where the twine bridges the concave rib side of the cut.

In packaging a bone-in and tied cut of this nature, the step of evacuating the air from the bag applies pressure on the unsupported twine bridges. That is to say, after air removal, the pressure of the atmosphere acts so as to press the unsupported twine members inwardly toward the concave ribs with such force that the twine is urged into substantially face to face engagement with the subjacent concave surface. Subsequent heating of the bag causes even further shrinkage and additional holding down force on the twine.

The tension on the twine, in other words, is very considerable, and in many cases in the past, this tension, constantly exerted against the tightly confining bag, has in time been effective to rupture the bag and cause a leak, thereby frequency requiring that the cut be destroyed, or otherwise disposed of, at a substantial economic loss.

It is therefore an object of the invention to provide a meat wrapping material and method of packaging meat therewith which substantially eliminates leakers resulting not only from exposed bone punctures but also from taut twine ruptures.

It is another object of the invention to provide a meat wrapping material and method of packaging meat therewith in which the base material is paper, thereby not only effecting substantial cost economies but also ease of disposability.

It is still another object of the invention to provide a meat wrap which can be pre-cut to substantially uniform sheet size and conveniently stacked at the wrapping station for ready accessibility and use.

It is a further object of the invention to provide a meat wrap which, although particularly useful in bone-in and tied rib cuts, can also be used in other meat cuts where exposed bone and unsupported twine spans tend to produce leakers.

It is yet a further object of the invention to provide a generally improved meat wrapping material and method of packaging meat therewith.

Other objects, together with the foregoing, are attained in the physical embodiment and process described in the following description and shown in the accompanying drawing, in which.

Figure 3:
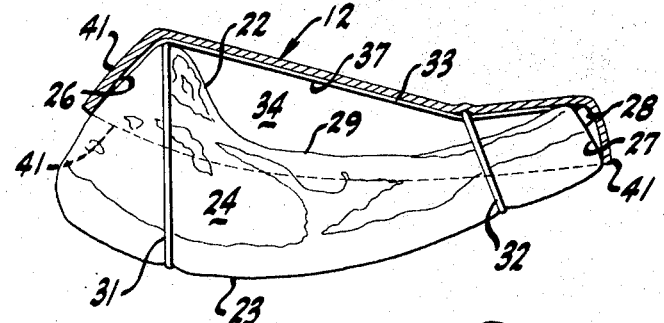
Figure 5:
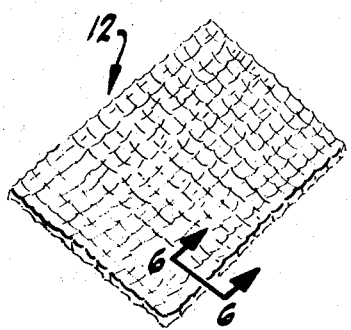
Figure 4:
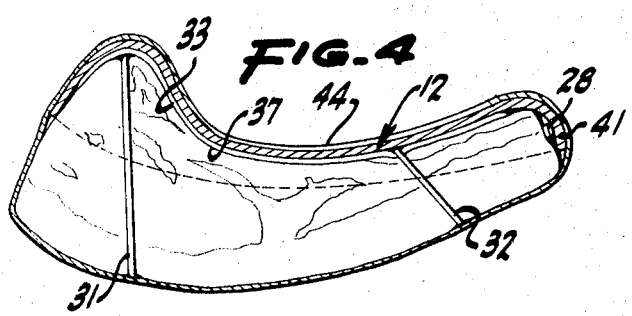
Figure 6:
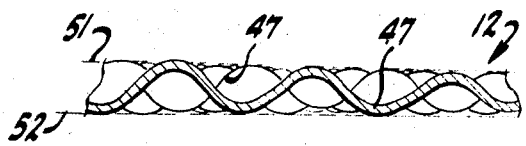

FIG. 3 is an end elevational view of a prepared and tied roast-ready rib showing the end of two typical lengthwise loops of twine and one transverse, or girthwise, loop of twine, and with a portion of the transverse loop spanning or bridging the concave rib side of the cut, the figure also showing, in section, a sheet of meat wrapping material installed on the concave side of the cut, with the margins molded downwardly around the edges and ends of the cut to provide an apron, and covering exposed bone on one side of the cut;

FIG. 4 is a view comparable to FIG. 3, but showing the appearance of the wrapped cut after bagging, air evacuation bag sealing and bag shrinking;

FIG. 5 is a perspective view to a diminished scale, showing a typical sheet of the wax-impregnated, rough-textured, paper toweling material; and, FIG. 6 is a sectional view, to an enlarged scale, of the meat wrap, taken on the line 6 — 6 in FIG. 5.

While the meat wrapping material of the invention and method of using same are susceptible of numerous physical embodiments, and can be exercised in a variety of ways, substantial numbers of the herein shown and described meat wrapping material and system have been made, tested and used, and in all instances have performed in an eminently satisfactory fashion.

The meat wrapper of the invention, generally designated by the reference numeral 12, comprises a sheet of rough-textured, synthetic thread-reinforced paper towel stock, such as Kimberly-Clark reinforced "Teri-Towel" stock (manufactured by Kimberly-Clark Corp., Neenah, Wisconsin), which has been impregnated, or saturated, with a non-toxic, food-grade type of wax, such as paraffin, or the like. The melting point of the wax is preferably in excess of 120° F.

For convenience, the sheet 12 is cut to a size and shape (e.g. 13 inch × 22 inch) which will adequately cover, or span, not only the concave side of the expected sizes of roast-ready ribs (or other cuts) to be wrapped, but which will, in addition, afford a substantial overhang so that when the overhanging margin is folded down and molded against the sides and ends of the cut, a substantial skirt, or apron, is provided. The size of the sheet is, furthermore, one which, in all cases, will cover any exposed bone exhibited by the particular cut.

Since a roast-ready beef rib cut is the one with which the meat wrap of the invention finds especial utility, it is toward this cut that the disclosure herein is particularly directed.

Figure 1:
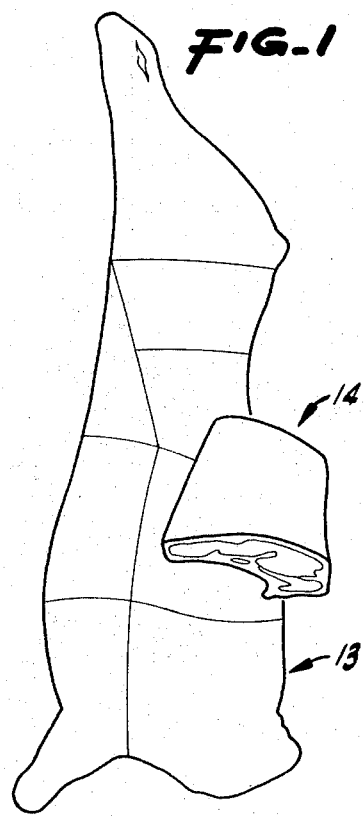
FIG. 1 is a diagrammatic side elevational view, to a small scale, of a side of beef, illustrating the appearance and relative location of a primal rib cut, from which a roast-ready rib cut, for example, is prepared.

Accordingly, FIG. 1 is included to show the portion of the forequarter 13 from which the primal rib 14 is obtained.

Customarily, the primal rib 14 is too heavy and bulky for convenient handling and, as a consequence, the primal rib is often cut to smaller sizes, such as a short-cut, oven-prepared rib 21 comprising an upwardly facing concave rib side 22, a lower, convex side 23, a pair of transverse ends 24, a lateral bone edge 26 and a lateral bone edge 27 showing a plurality of exposed rib bone ends 28 of concavely curved ribs 29.

In customary fashion, the rib cut is tied with a spaced pair of lengthwise loops 31 and 32 of strong twine and a plurality of spaced-apart girthwise loops 33.

Figure 2:
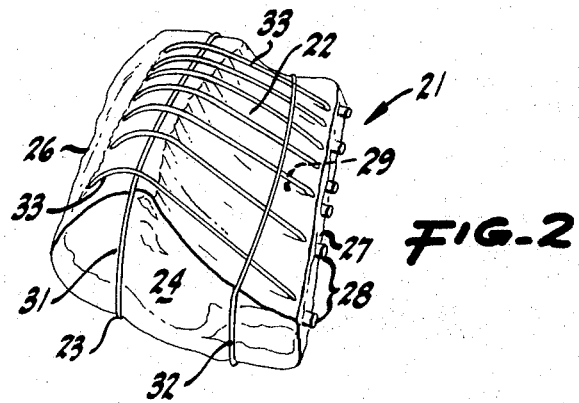
FIG. 2 is a perspective view of a typical rib cut of meat, showing a plurality of exposed bones and several lengthwise and girthwise loops of strong twine arranged so as to hold the cut together.

As appears most clearly in FIG. 3, wherein the concave ribs 29 face upwardly, a concavity 34 is formed, the concavity being spanned by an unsupported portion 37 of the girthwise twine loop 33. The lengthwise loop 32 shown in FIG. 2, overlies the girthwise loop 33 and therefore slightly depresses the loop 33, the extent of the concavity and the twine depression being shown somewhat exaggerated in FIG. 3.

At this juncture, the meat wrapper sheet 12 is placed on the meat so as to cover the upwardly facing concave side 22 of the cut. The very rough texture of the paper towel-like material and the relatively low melting point of the paraffin combine to afford flexibility to the sheet 12. Consequently, the operator can readily mold the meat wrap 12 so that it not only conforms with the slopes of the twine but also covers a portion of the lateral edges 26 and 27 and the ends 24 of the cut, thereby forming a depending skirt 41, or apron, around the margin of the cut.

As also appears most clearly in FIG. 3, the protruding bone end 28 is well covered by the downwardly formed and molded apron 41, which thereby affords a protective buffer against puncture by the bone.

After the meat wrapper is installed, the meat cut 21 and the protective cover 12 are placed within a conventional heat-shrinkable plastic bag 44 (e.g. a "Seran Wrap-S" made by Dow Chemical Co., Midland, Mich.) which is then subjected to the usual process of air evacuation and bag sealing.

At this juncture, the force exerted by the atmospheric air pressure is sufficient to force the plastic bag 44 tightly against the contents and, more particularly, to deform the underlying meat wrap 12 toward engagement with the covered portion of the meat, even to the extent of downwardly deforming the previously unsupported twine portion 37 spanning the concavity 34. In other words, as is shown in FIG. 4, the twine portions 37 are urged downwardly toward the concave ribs 29 by the pressure of the atmospheric air acting on the plastic bag 44 which, in turn, presses downwardly on the deformable meat wrapper 12 superimposed on the bridge portions 37 of the twine.

Thereafter, the bag and contents are subjected to a predetermined temperature for a predetermined length of time, as by passing the bag through a hot air tunnel or immersing it in very hot water. This process is well known in the art, and since it forms no direct part of the present invention, per se, is neither shown nor described in detail.

It is of importance to note, however, that the heat treatment serves to shrink the bag still further, so that at the completion of the heat treatment, the bag is stretched into skin-tight engagement with respect to the contents.

In the absence of any protection to the exposed bone 28 it can be visualized that any sharp or ragged bone edges would tend to puncture the skin-tight bag 44 and produce a leaker.

The protective apron 41 over the bone 28 (see FIG. 4) serves as an extremely effective buffer against puncture. This results in part from the very rough, or crinkled or corrugated texture of the meat wrap 12, which, owing to the undulations 47 of the material, affords a very substantial over-all beam strength and cushioning effect. The undulations 47, provide a relatively large physical separation, or spacing, between an imaginary planar envelope 51 on one surface of the material and an imaginary planar envelope 52 on the opposite surface of the material (see FIG. 6), with each one of the undulations being itself capable of providing beam strength and resistance to individual crushing and rupture.

As will also be realized, the protective apron comprises not merely a single sheet of thickness, but, instead, a covering which frequently is two and sometimes three layers, as a result of folding down of the overhanging portion and molding these folds into flat condition. These multiple layers are blended together, as it were, to form a single thick layer. During the time they are subjected to the heat, the wax is softened to the point where the layers of paper toweling and wax become a single laminated covering.

Additionally, since each bag is customarily taken from the heat treatment to cold storage or low temperature transit facilities, the wax which impregnates the rough paper wrap tends, under low temperature, to harden and thereby afford an even greater rigidity to the laminated apron, which forms an extremely tough shield covering the meat.

The foregoing remarks are also applicable to the anti-rupture effect of the meat wrap 12 on the deformed twine portion 37. That is to say, the over-all beam strength provided by the wrapper 12 helps to resist the tendency of the deformed and tensioned twine 33 to restore itself to its initial linear condition. The apron portion 41 also adds strength owing to the laminated layers described above which makes a rigid molded structure of great strength.

So also, the corrugations 47 serve to reduce, to a marked degree, the unit pressure exerted by the exposed bone in tending to puncture the bag, or the tensioned twine in tending to rupture the bag in the vicinity of the original concavity. The disruptive forces, in other words, are transmitted through the undulations so that the bearing areas are substantially enlarged, and the unit pressures are correspondingly reduced.

As a result of this combination of efforts, the paper meat wrap of the invention 12 affords a cheap, convenient and reliable cushion which minimizes not only bone puncture but also twine rupture in connection with the packaging of various cuts of meat.

What is claimed is:

1. A method of packaging a bone-in cut of meat having a concave side, a convex side, a pair of ends and a pair of lateral edges, at least one of said lateral edges being characterized by exposed bone, said method comprising the steps of:
   a. tying said cut of meat with a plurality of first loops of strong twine spaced lengthwise to pass around said ends and a plurality of second loops of strong twine spaced transversely to pass around said edges, around said convex side and to span the distance across said concave side;
   b. placing a sheet of wax-impregnated, rough-textured paper toweling on top of the twine loop portion spanning said concave side, said paper toweling being sufficiently large in extent to afford an overhanging margin capable of being molded around and against portions of said ends and said lateral edges for an apron covering at least said exposed bone;
   c. molding said overhanging margin of said paper toweling around and against portions of said ends and said lateral edges to form an apron covering at least said exposed bone;
   d. inserting the tied and covered meat into a heat shrinkable plastic bag;
   e. evacuating the air from said bag to mold said bag against the contents;
   f. sealing the bag;
   g. subjecting the bag to heat for a predetermined length of time to effect the shrinkage of the bag for skin-tight engagement with the contents; and,
   h. removing the bag from the heat for transfer elsewhere.

2. A meat packaging method as in claim 1 wherein the paper toweling impregnating wax is a paraffin, and wherein the paper toweling is of synthetic thread-reinforced paper towel stock.

* * * * *